(12) United States Patent
Choi et al.

(10) Patent No.: US 11,551,054 B2
(45) Date of Patent: Jan. 10, 2023

(54) SYSTEM-AWARE SELECTIVE QUANTIZATION FOR PERFORMANCE OPTIMIZED DISTRIBUTED DEEP LEARNING

(71) Applicant: International Business Machines Corporation, Armonk, NY (US)

(72) Inventors: Jungwook Choi, Chappaqua, NY (US); Swagath Venkataramani, Yonkers, NY (US); Vijayalakshmi Srinivasan, New York, NY (US); Kailash Gopalakrishnan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 803 days.

(21) Appl. No.: 16/553,102

(22) Filed: Aug. 27, 2019

(65) Prior Publication Data

US 2021/0064954 A1    Mar. 4, 2021

(51) Int. Cl.
*G06N 3/04* (2006.01)
*G06N 3/08* (2006.01)

(52) U.S. Cl.
CPC .............. *G06N 3/04* (2013.01); *G06N 3/08* (2013.01)

(58) Field of Classification Search
CPC ........ G06N 3/04; G06N 3/0454; G06N 3/063; G06N 3/08
See application file for complete search history.

(56) References Cited

U.S. PATENT DOCUMENTS

| 10,325,352 | B1 | 6/2019 | Kim et al. |
| 2016/0328645 | A1* | 11/2016 | Lin .......................... G06N 3/08 |
| 2016/0328646 | A1 | 11/2016 | Lin et al. |
| 2017/0347061 | A1 | 11/2017 | Wang et al. |
| 2018/0018553 | A1* | 1/2018 | Bach ......................... G06N 3/02 |
| 2018/0157968 | A1* | 6/2018 | Henry .................... G06N 3/063 |
| 2018/0197081 | A1 | 7/2018 | Ji et al. |

(Continued)

FOREIGN PATENT DOCUMENTS

| CN | 107886073 | 4/2018 |
| CN | 109740737 | 5/2019 |

OTHER PUBLICATIONS

Disclosed Anonymously, IP.com No. IPCOM000252366D, Machine Learning to Dissipate a Cyclone, Jan. 5, 2016, 35 pages.

(Continued)

*Primary Examiner* — Anner N Holder
(74) *Attorney, Agent, or Firm* — Daniel Morris; Otterstedt & Kammer PLLC

(57) ABSTRACT

A convolutional neural network includes a front layer, a back layer, and a plurality of other layers that are connected between the front layer and the back layer. One of the other layers is a transition layer. A first precision is assigned to activations of neurons from the front layer back to the transition layer and a second precision is assigned to activations of the neurons from the transition layer back to the back layer. A third precision is assigned to weights of inputs to neurons from the front layer back to the transition layer and a fourth precision is assigned to weights of inputs to the neurons from the transition layer back to the back layer. In some embodiments the layers forward of the transition layer have a different convolutional kernel than the layers rearward of the transition layer.

20 Claims, 7 Drawing Sheets

(56) References Cited

U.S. PATENT DOCUMENTS

| | | | | |
|---|---|---|---|---|
| 2019/0205095 A1* | 7/2019 | Gupta | ................... | G11C 11/412 |
| 2019/0258921 A1* | 8/2019 | Lie | ....................... | G06N 3/0445 |
| 2019/0354865 A1* | 11/2019 | Reisser | ................ | G06N 3/0454 |

OTHER PUBLICATIONS

Disclosed Anonymously, IP.com No. IPCOM000252103D, Compressed Sensing for Monitoring of an Application, Dec. 15, 2017, 33 pages.

Disclosed Anonymously, IP.com No. IPCOM000252098D, Automatically Scaling Multi-Tenant Machine Learning, Dec. 15, 2017, 35 pages.

Wu, J. et al., Error Compensated Quantized SGD and its Applications to Large-Scale Distributed Optimization, Proceedings of the 35th International Conference on Machine Learning, Stockholm, Sweden, PMLR 80, Jun. 2018, 12 pages.

Zhou, Y. et al., Adaptive Quantization for Deep Neural Network, Thirty-Second AAAI Conference on Artificial Intelligence, Dec. 2017, 14 pages.

Wen, W. et al., TemGrad: Ternary Gradients to Reduce Communication in Distributed Deep Learning, 31st Conference on Neural Information Processing Systems (NIPS 2017), Dec. 2017, 13 pages.

Courbariaux, et al., Binaryconnect: Training deep neural networks with binary weights during propagations. In Advances in neural information processing systems (pp. 3123-3131), Nov. 2015.

Courbariaux, et al. Binarized neural networks: Training deep neural networks with weights and activations constrained to+ 1 or-1, arXiv preprint arXiv: 1602.02830 (Apr. 2016), 11 pages.

Hubara, et al. Quantized neural networks: Training neural networks with low precision weights and activations, The Journal of Machine Learning Research 18.1 (Jan. 2017), pp. 6869-6898.

Zhou, et al., Dorefa-net: Training low bitwidth convolutional neural networks with low bitwidth gradients, arXiv preprint arXiv:1606.06160 (Jun. 2016), 13 pages.

Rastegari, et al. Xnor-net: Imagenet classification using binary convolutional neural networks, European Conference on Computer Vision. Springer, Cham, Aug. 2016, pp. 1-7.

Li et al., Ternary weight networks, 30th Conference on Neural Information Processing Systems (NIPS, Nov. 2016), 5 pages.

Zhu, et al. Trained ternary quantization, arXiv preprint arXiv: 1612.01064 (Dec. 2016), 10 pages.

Hou, Let al., Loss-aware binarization of deep networks, arXiv preprint arXiv:1611.01600 (Nov. 2016), 11 pages.

Yin, et al. Quantization and training of low bit-width convolutional neural networks for object detection, arXiv preprint arXiv:1612.06052 (Dec. 2016), 10 pages.

Miyashita, et al. Convolutional neural networks using logarithmic data representation., arXiv preprint arXiv:1603.01025 (Mar. 2016), 10 pages.

Wu, Xundong, Yong Wu, and Yong Zhao. "Binarized neural networks on the ImageNet classification task." arXiv preprint arXiv: 1604.03058 (Nov. 2016). 4 pages.

Kuan Wang, Zhijian Liu, Yujun Lin, Ji Lin, and Song Han, "HAQ: Hardware-Aware Automated Quantization with Mixed Precision", arXiv preprint arXiv:1811.08886v3 (Apr. 2019). 10 pages.

Yoshua Bengio, Nicholas Leonard and Aaron Courville, "Estimating or Propagating Gradients Through Stochastic Neurons for Conditional Computation" arXiv preprint arXiv:1308.3432v1 Aug. 2013, 12 pages.

Xing, Shuang. PRC(ISA/CN) as ISA. Patent Cooperation Treaty International Search Report, PCT/IB2020/56741, dated Sep. 21, 2020, 9 pages.

* cited by examiner

| Resnet-18 | HalfPrec | TerWeight | TerAct | TernaryNet | Hybrid* |
|---|---|---|---|---|---|
| CONV1_1 | 34.3% | 34.4% | 35.0% | 35.0% | 35.0% |
| CONV2_1 | 67.1% | 67.8% | 87.1% | 87.1% | 87.1% |
| CONV2_2 | 46.0% | 46.3% | 87.1% | 87.1% | 87.1% |
| CONV2_3 | 67.1% | 67.8% | 87.1% | 87.1% | 87.1% |
| CONV2_4 | 46.0% | 46.3% | 87.1% | 87.1% | 87.1% |
| CONV3_1 | 76.8% | 79.1% | 79.1% | 79.1% | 79.1% |
| CONV3_2 | 87.1% | 87.1% | 87.1% | 87.1% | 87.1% |
| CONV3_3 | 87.1% | 87.1% | 87.1% | 87.1% | 87.1% |
| CONV3_4 | 83.7% | 87.1% | 87.1% | 87.1% | 87.1% |
| CONV4_1 | 79.1% | 79.1% | 79.1% | 79.1% | 79.1% |
| CONV4_2 | 87.1% | 87.1% | 87.1% | 87.1% | 87.1% |
| CONV4_3 | 87.1% | 87.1% | 87.1% | 87.1% | 87.1% |
| CONV4_4 | 87.1% | 87.1% | 87.1% | 87.1% | 87.1% |
| CONV5_1 | 49.7% | 79.1% | 73.5% | 73.5% | 79.1% |
| CONV5_2 | 57.9% | 86.3% | 81.4% | 81.4% | 86.3% |
| CONV5_3 | 59.4% | 86.3% | 81.8% | 81.8% | 86.3% |
| CONV5_4 | 56.5% | 86.3% | 81.1% | 81.1% | 86.3% |
| FCON1 | 2.6% | 3.5% | 3.3% | 3.9% | 3.5% |

FIG. 2

SYSTEM-AWARE SELECTIVE QUANTIZATION FOR PERFORMANCE OPTIMIZED DISTRIBUTED DEEP LEARNING

BACKGROUND

The present invention relates to the electrical, electronic, and computer arts, and more specifically, to machine learning structures such as neural networks.

A neural network is an execution model of a machine learning training or classification algorithm. Typically, the compute operations of this model are executed on a plurality of processors that are configured to work together.

In a neural network, the processors simulate thousands or millions of neurons, which are connected by axons and synapses. Each connection is enforcing, inhibitory, or neutral in its effect on the activation state of connected neural units. Each individual neural unit has a summation function that multiplies each of its inputs by a corresponding weight, and then aggregates the weighted values to obtain a total signal. In some implementations, there is a threshold function or limiting function on at least some connections and/or on at least some neural units, such that the total signal must surpass the limit before the limited neural unit will activate. Once a neural unit has activated, it sends an activation signal as an input to one or more other neural units. A neural network can implement supervised, unsupervised, or semi-supervised machine learning.

A typical output of a deep neural network (DNN) is a labeling of the input as belonging to one of several categories. Typically, the labeling output is based on patterns learned from a training set of inputs and labels. DNNs achieve superior accuracy for applications with high computational complexity using very large models, which require 100s of megabytes (MBs) of data storage, and high bandwidth for data movement. This high computational complexity poses a technological challenge for widespread deployment, particularly in resource constrained edge environments.

Notwithstanding the foregoing, neural networks are known to make errors in assigning labels, in that some of the labels assigned by a neural network do not agree with the labels that are assigned by a human expert reviewing the same inputs.

SUMMARY

Principles of the invention provide techniques for system-aware selective quantization for performance optimized distributed deep learning.

In one aspect, an exemplary method includes establishing a convolutional neural network. The convolutional neural network includes a front layer that has a first number of neurons and a first convolutional kernel; a back layer that has a second number of neurons and a second convolutional kernel, wherein the second number of neurons is less than the first number of neurons; and a plurality of other layers that are connected between the front layer and the back layer. The method further includes selecting from among the plurality of other layers a transition layer that has a third number of neurons and a third convolutional kernel; assigning a first activation precision to activations of neurons from the front layer back to the transition layer and assigning a second activation precision to activations of the neurons from the transition layer back to the back layer; and assigning a first weight precision to weights of inputs to neurons from the front layer back to the transition layer and assigning a second weight precision to weights of inputs to the neurons from the transition layer back to the back layer. The first activation precision is different from the second activation precision. The first weight precision is different than the second weight precision. The transition layer is selected to correspond to a transition from activation-heavy layers to weight-heavy layers.

In another aspect, an exemplary method includes establishing a convolutional neural network. The convolutional neural network includes a front layer that has a first number of neurons and a first convolutional kernel; a back layer that has a second number of neurons and a second convolutional kernel, wherein the second number of neurons is less than the first number of neurons; and a plurality of other layers that are connected between the front layer and the back layer. The method includes selecting from among the plurality of other layers a transition layer that has a third number of neurons and a third convolutional kernel; assigning the first convolutional kernel to neurons from the front layer back to the transition layer; and assigning the second convolutional kernel to neurons from the transition layer back to the back layer. The first convolutional kernel has a first compression by reducing to zero values that are less than a first fixed fraction of the maximum value in the kernel window. The second convolutional kernel has a second compression by reducing to zero values that are less than a second fixed fraction of the maximum value in the kernel window. The second fixed fraction is smaller than the first fixed fraction. The transition layer is selected to correspond to a transition from activation-heavy layers to weight-heavy layers.

In yet another aspect, an exemplary method includes establishing a convolutional neural network. The convolutional neural network includes a front layer that has a first number of neurons and a first convolutional kernel; a back layer that has a second number of neurons and a second convolutional kernel, wherein the second number of neurons is less than the first number of neurons; and a plurality of other layers that are connected between the front layer and the back layer. The method includes selecting from among the plurality of other layers a transition layer that has a third number of neurons and a third convolutional kernel; assigning a first activation precision to activations of neurons from the front layer back to the transition layer and assigning a first weight precision to weights of inputs to the neurons from the front layer back to the transition layer; and assigning a second activation precision to activations of neurons from the transition layer back to the back layer and assigning a second weight precision to weights of inputs to the neurons from the transition layer back to the back layer. The first activation precision is less than the first weight precision. The second activation precision is greater than the second weight precision. The transition layer is selected to correspond to a transition from activation-heavy layers to weight-heavy layers.

One or more embodiments of the invention or elements thereof can be implemented in the form of a computer program product including a computer readable storage medium with computer usable program code for performing or facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to perform or to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Reducing a memory footprint (and bandwidth requirements) of a neural network while preserving model accuracy.

Enhancing the computing throughput of a convolutional neural network without diminishing classification accuracy.

Enhancing the classification accuracy of a convolutional neural network without increasing computational resource loading.

Optimizing quantization of activations and weights in a neural network responsive to hardware constraints of a system executing the neural network.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 depicts, in a table, processing engine utilization percentages that can be improved by aspects of the invention;

DETAILED DESCRIPTION

Figure 1:
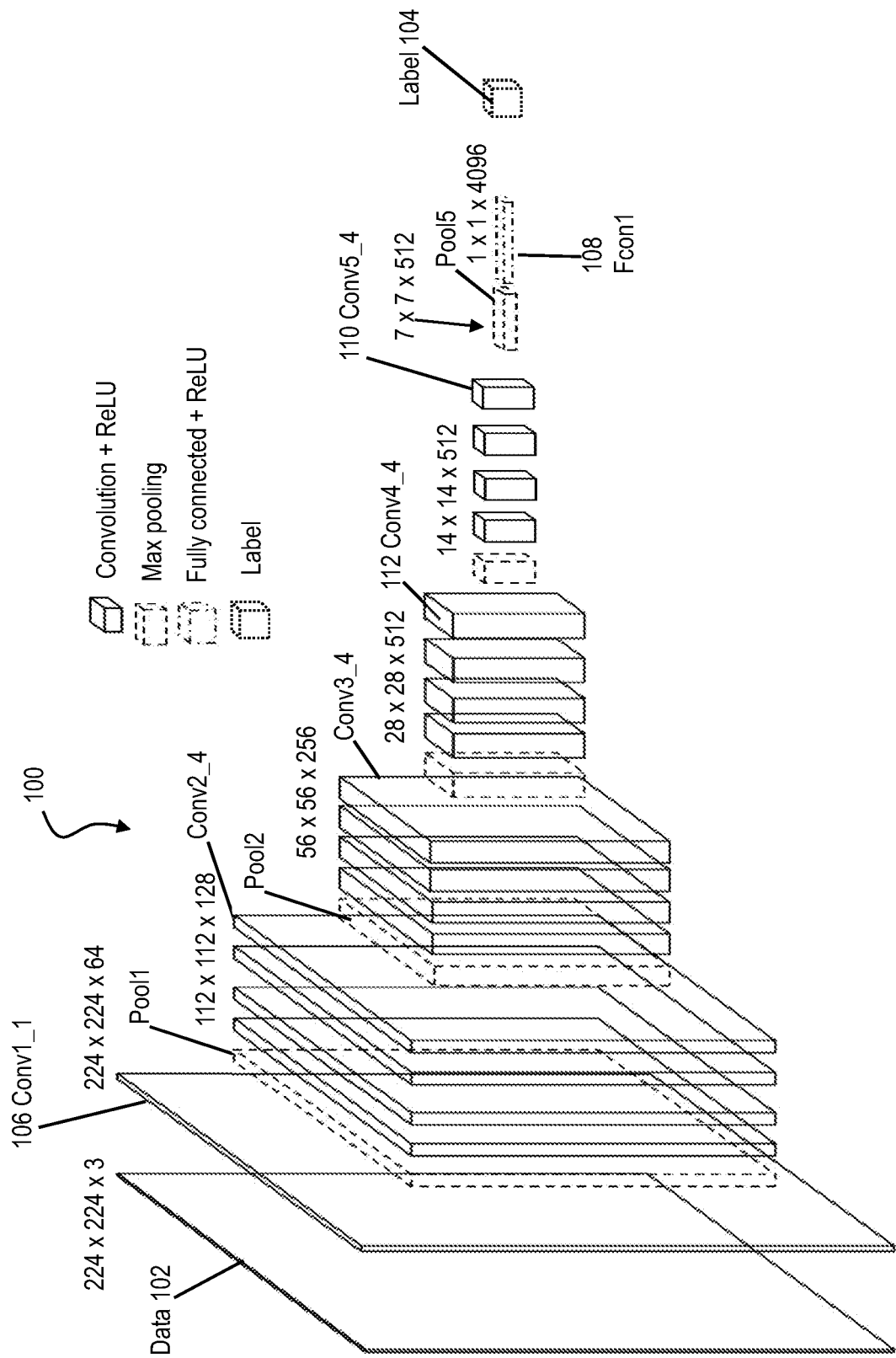
FIG. 1 depicts, in a schematic, an exemplary convolution neural network.

FIG. 1 depicts an exemplary convolutional neural network (CNN) 100. The CNN 100 receives an input matrix 102 (usually a matrix of pixel values, which can be of any dimension) and produces a classification label 104. The CNN 100 includes a front layer 106, which is a convolutional layer that receives the input matrix 102. The CNN 100 also includes a classification layer (fully connected layer) 108, which produces the classification label 104. Between the front layer 106 and the classification layer 108 are a plurality of other convolutional layers, including a back layer 110 and a transition layer. The back layer 110 is the layer closest to the fully connected layer 108 and has the fewest number of neural units, each of which is tuned to recognize a high-level feature of the input matrix 102. The transition layer is connected somewhere among the layers between the front layer 106 and the back layer 110.

CNNs are a species of deep neural network (DNN). DNNs achieve superior accuracy for applications with high computational complexity using very large models that require 100s of megabytes (MBs) of data storage, and that require high bandwidth for data movement. The complexity of such models poses a tremendous challenge for widespread deployment, especially in resource constrained edge environments. One or more embodiments provide a method and apparatus to reduce the memory footprint (and bandwidth requirements) while preserving model accuracy as much as possible.

In operation of the CNN 100, each neuron of each convolutional layer scans for activations from neurons selected from the preceding layer, assigns weights to the selected neurons, and outputs an activation based on a sum of the weighted activations received from the selected neurons. In the fully connected layer 108 every neuron from the preceding layer is connected to every neuron of this layer. Typically, output activations of the fully connected layer are used to produce the classification label 104.

Generating activations for each neuron is computationally intensive, and the computational workload increases as the precision of the activations increases. Typically, higher precisions activations (closer to analog) result in more accurate classifications, although there is a point at which the neural network structure limits accuracy gains from higher precision. Computational performance can be enhanced (workload reduced) by reducing the precision of selected weights or activations. Aspects of the invention relate to how to select the weights and activations that are to have reduced precision ("quantization").

Generally, a CNN is more robust to quantization (accuracy changes less with change in precision) when it is trained with more data. For example, a CNN provided with one thousand training images is more robust than the same CNN provided with only one dozen training images. Similarly, a CNN provided with one thousand images that are 4096× 3072 pixels will be more robust than the same CNN provided with one thousand images that are 512×384 pixels. Thus, an aspect of the invention is the discovery that precision of activations can be reduced more when there are a large number of activations to work with (i.e. many neurons providing many outputs, in the convolutional layers near the front layer 106) and that precision of weights can be reduced more when there are a large number of weights to work with (i.e. fewer neurons receiving many inputs, in the convolutional layers near the back layer 110). In one or more embodiments, the transition layer 112 demarks a boundary between quantized activations (between the front layer 106 and the transition layer) and quantized weights (between the transition layer and the back layer 110).

It will be appreciated, in view of the foregoing explanation, that selection of the transition layer has a significant effect on both accuracy and computational efficiency of the CNN 100. FIG. 2 depicts, in a table 200, improvements in utilization for an exemplary processing engine (PE) for an exemplary CNN(ResNet-18) by selectively quantizing activations, weights, or both of the different layers. The first column shows the results for half-precision quantization at all layers. The second column shows the results for ternary (2 bit) quantization of weights at all layers. The third column shows the results for ternary quantization of activations at all layers. The fourth column shows the results for ternary quantization of both weights and activations at all layers. The fifth column shows the results for ternary quantization of activations from the front layer 106 through the transition layer 112, and ternary quantization of weights from after the transition layer 112 through the back layer 110. For example, if precision of weights and activations is reduced by one half at all layers, then PE utilization at layer CONV2_4 is 46.0%. If only the weights at all layers are quantized to two bit precision, then PE utilization is 46.3%. If only the activations at all layers are quantized to two bit precision, then PE utilization is 87.1%. Empirically, the greatest benefit for computational efficiency at layer CONV2_4 can be obtained by quantizing the activations. Further down, at layer CONV5_1, quantizing the weights results in 79.1% PE utilization whereas quantizing the activations results in only 73.5% PE utilization.

Figure 3:
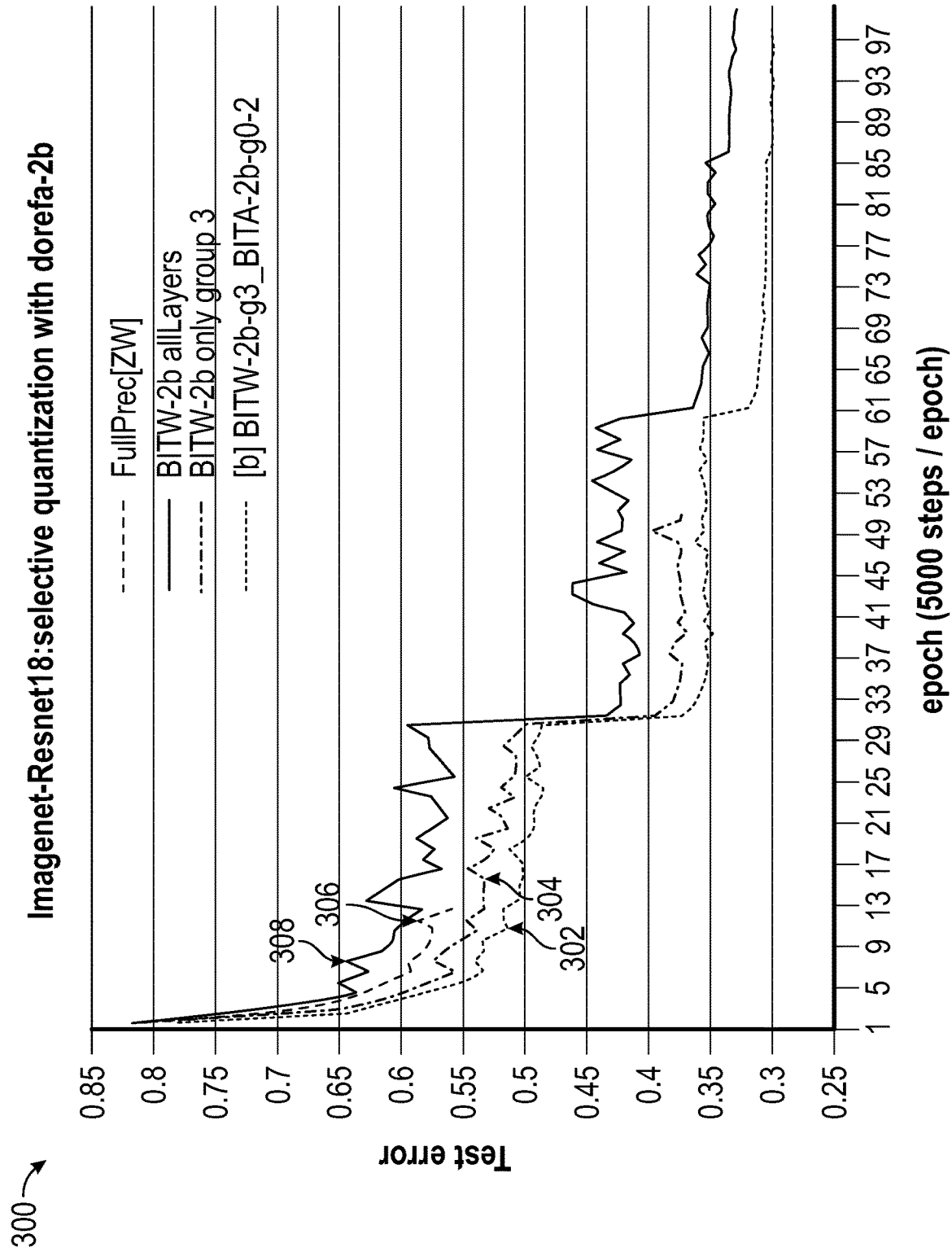
FIG. 3 depicts, in a graph, prediction accuracies of convolutional neural network optimized according to exemplary embodiments of the invention.

FIG. 3 depicts, in a graph 300, prediction accuracies of the convolutional neural network 100 of FIG. 1 when it has been optimized according to exemplary embodiments. The prediction accuracies are shown across varying epochs of training, with the number of training steps increasing from left to right. At 302, the accuracy is best for high precision values of activations and weights. At 304, the next best accuracy is achieved for two bit quantized weight values only in the convolutional layers of group 3. (Note that group 3 on the graph corresponds to CONV4_1 through CONV4_4 in the table 200 and in FIG. 1.) At 306, third best accuracy is attained using two bit quantized weight values in the group 3 convolutional layers and using two bit quantized activations in the groups 0-2 convolutional layers. (Note that group 0 on the graph corresponds to CONV1_1 in table 200 and in FIG. 1, while group 2 corresponds to CONV3_1 through CONV3_4.) At 308, the least accurate approach is to quantize weights in all layers.

Figure 4:
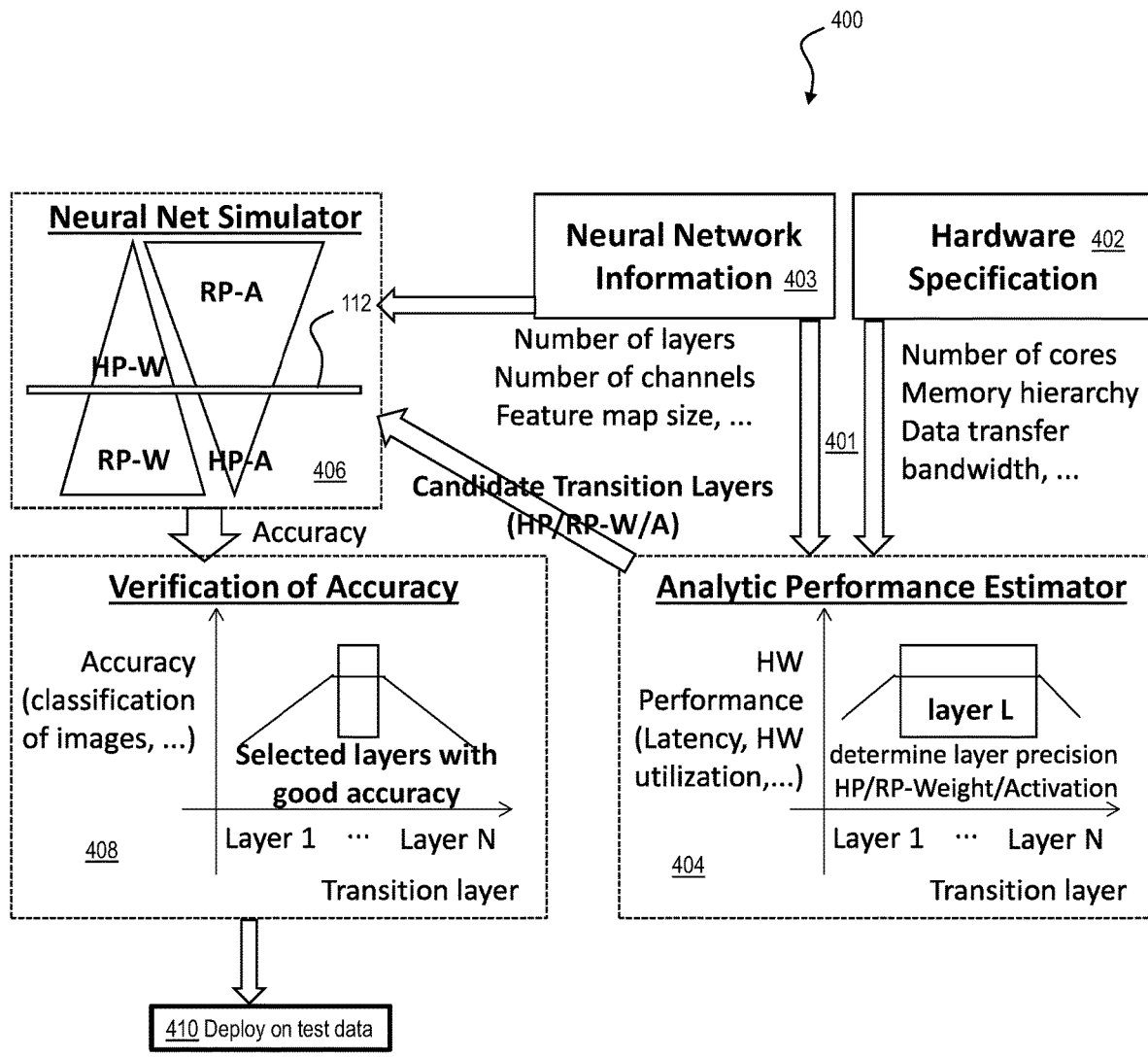
FIG. 4 depicts, in a schematic, a method for selecting the location of a transition layer in a convolutional neural network, according to an exemplary embodiment.

Accordingly, an aspect of the invention is a method 400 for selecting the transition layer 112, up to which the activations are quantized and after which the weights are quantized, as depicted in a flowchart in FIG. 4. At 401, feed hardware system parameters/constraints 402 and a description 403 of the neural network 100 to an analytical performance estimation model 404, which iteratively varies the neural network description 403 to approach an optimal value of a selected hardware system metric. For example, execution latency may be chosen as a metric of interest for illustration purposes. Other metrics such as throughput, power, or energy efficiency could also serve as a metric of interest. Based on the system constraints (bandwidth, on-chip memory capacity, or compute capability) the performance estimator generates, for each data structure of each layer of the neural network, the weight and activation precisions that are expected to produce the optimal value for the metric of interest. For example, the performance estimator can sweep over the possible precision configurations, and for each precision choice, it checks data reuse and memory occupancy to estimate the latency given the system constraints. Thus, at 404 the method 400 recommends which of the layers of the neural network 100 should be the transition layer 112. Generally, activations are quantized before the transition layer 112 while weights are high precision. Then weights are quantized after layer 112 while activations are high precision. At layer 112, in some embodiments, both weights and activations are high precision. In other embodiments, at layer 112 both weights and activations are quantized. In some embodiments, at layer 112 the weights are quantized while the activations are high precision. In other embodiments, at layer 112 the activations are quantized while the weights are high precision. Quantization of weights or activations in the transition layer would depend on the estimated performance; e.g., if weight is more dominant than activation in that layer, the performance estimator would indicate to use lower precision for weight.)

At 406, execute the neural network 100 on training data (a neural network simulation), using the recommended quantizations. As an example, ImageNet dataset (Olga Russakovsky, Jia Deng, Hao Su, Jonathan Krause, Sanjeev Satheesh, Sean Ma, Zhiheng Huang, Andrej Karpathy, Aditya Khosla, Michael Bernstein, Alexander C. Berg and Li Fei-Fei. ImageNet Large Scale Visual Recognition Challenge. IJCV, 2015) can be used for image classification tasks. At 408, determine whether a desired accuracy of classification is achieved with the selective quantization of weights and/or activations for each layer. As a non-limiting example, in one embodiment, good accuracy is an error rate of less than 3%; in another embodiment, good accuracy is an error rate of less than 2%. In another embodiment, an acceptable accuracy is an error rate that is degraded no more than 1% from the full-precision baseline accuracy. An exact value of good accuracy will be determined by the skilled worker empirically for any given application, and is not important to the scope of the invention. One aspect of the invention, however, is the step of making the determination whether good accuracy has been achieved. If not, adjust the recommendation of layer 112.

Once accuracy has been confirmed for a given recommendation of the transition layer 112, then, at 410, deploy the neural network 100 on test data with the quantized weights and activations of each layer according to the description 403. As previously discussed, activations are quantized before the transition layer 112 while weights are high precision; after the transition layer 112, weights are quantized while activations are high precision. Treatment of weights and activations at layer 112 varies according to various embodiments.

Figure 5:
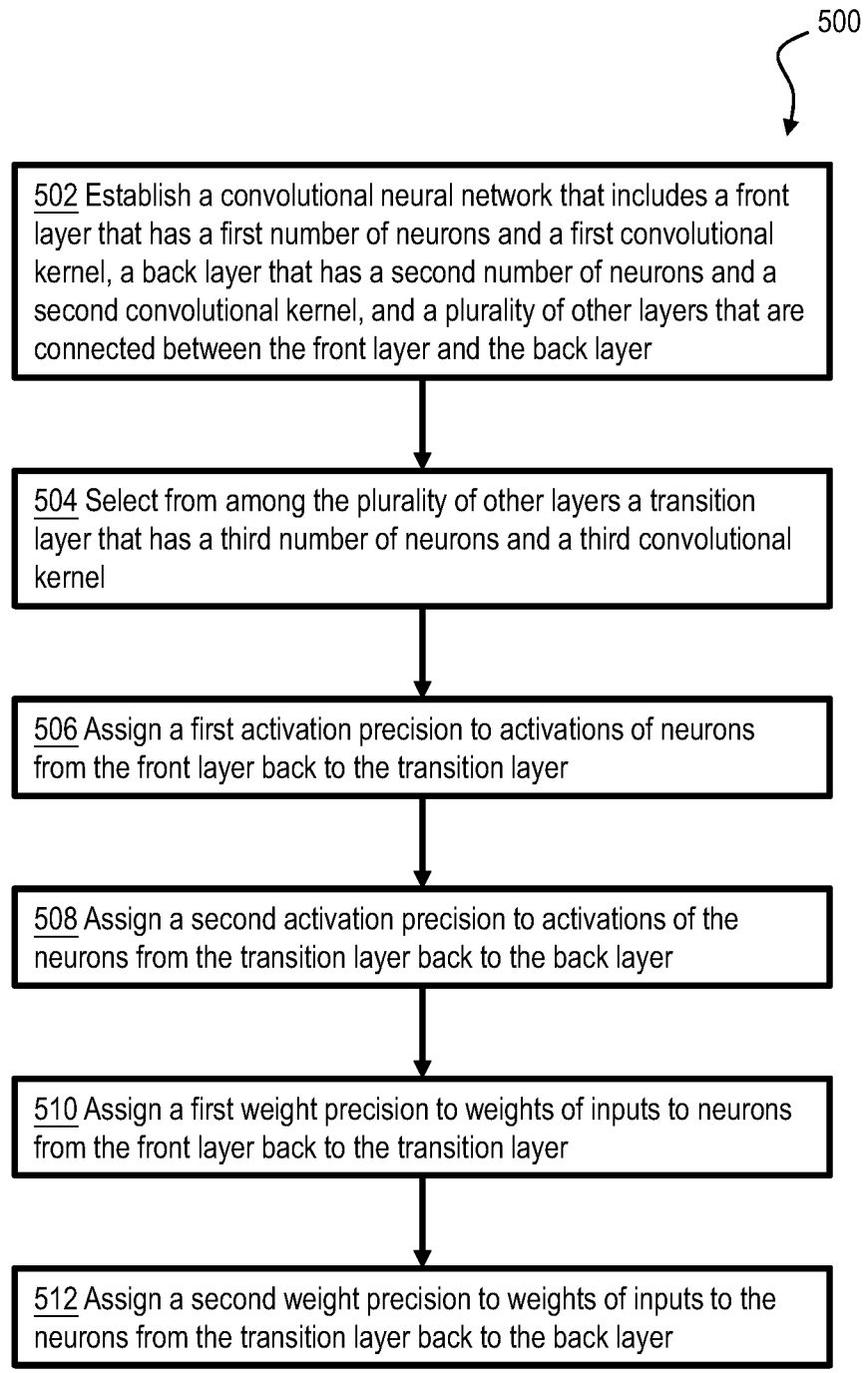
FIG. 5 depicts, in a flowchart, a method for optimizing a convolutional neural network, according to an exemplary embodiment.

FIG. 5 depicts, in a flowchart, a method 500 for optimizing a convolutional neural network. At 502, establish the neural network including a front layer, a back layer, and other layers that are connected between the front layer and the back layer. At 504 select a transition layer from among the plurality of other layers, based on determining a transition from activation-heavy layers to weight-heavy layers. At 506 assign a first activation precision to activations of neurons from the front layer back to the transition layer. At 508 assign a second activation precision to activations of neurons from the transition layer back to the back layer. At 510 assign a first weight precision to weights of inputs to neurons from the front layer back to the transition layer and at 512 assign a second weight precision to weights of inputs to neurons from the transition layer back to the back layer.

Figure 6:
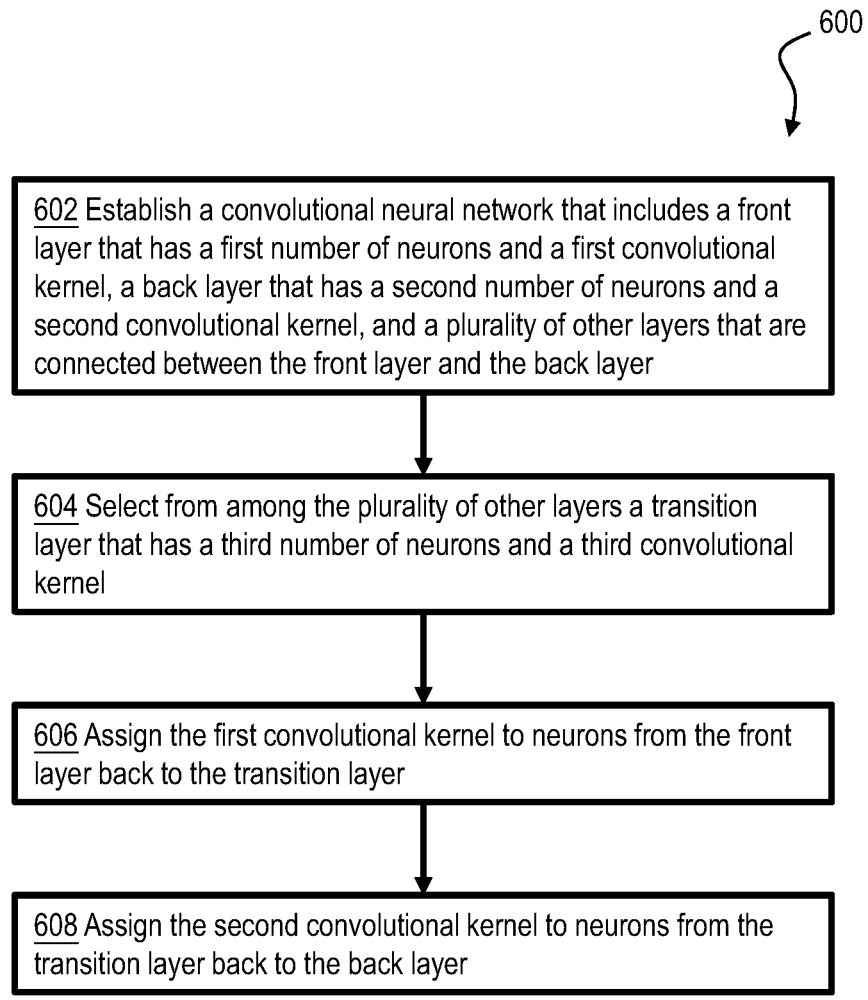
FIG. 6 depicts, in a flowchart, another method for optimizing a convolutional neural network, according to an exemplary embodiment.

FIG. 6 depicts, in a flowchart, another method 600 for optimizing a convolutional neural network. At 602, establish the neural network including a front layer, a back layer, and other layers that are connected between the front layer and the back layer. At 604 select a transition layer from among the plurality of other layers, based on determining a transition from activation-heavy layers to weight-heavy layers. At 606 assign a first convolutional kernel to layers from the front layer back to the transition layer. At 608 assign a second convolutional kernel to layers from the transition layer back to the back layer. The first convolutional kernel compresses its input by reducing to zero values that are less than a first fixed fraction of the maximum value in the kernel window. The second convolutional kernel compresses its input by reducing to zero values that are less than a second fixed fraction of the maximum value in the kernel window. The second fixed fraction is smaller than the first fixed fraction.

Given the discussion thus far, it will be appreciated that, in general terms, an exemplary method 500, according to an aspect of the invention, includes at 502 establishing a convolutional neural network 100. The convolutional neural network includes a front layer 106 that has a first number of neurons and a first convolutional kernel; a back layer 110 that has a second number of neurons and a second convolutional kernel; and a plurality of other layers that are connected between the front layer and the back layer. The second number of neurons is less than the first number of neurons. The method further includes at 504 selecting from among the plurality of other layers a transition layer 112 that has a third number of neurons and a third convolutional kernel; at 506 assigning a first activation precision to activations of neurons from the front layer back to the transition layer; at 508 assigning a second activation precision to activations of the neurons from the transition layer back to the back layer; at 510 assigning a first weight precision to weights of inputs to neurons from the front layer back to the transition layer; and at 512 assigning a second weight precision to weights of inputs to the neurons from the transition layer back to the back layer. The first activation precision is different from the second activation precision. The first weight precision is different than the second weight precision. The transition layer is selected to correspond to a transition from activation-heavy layers to weight-heavy layers.

In one or more embodiments, at least one of the second convolutional kernel and the third convolutional kernel is different from the first convolutional kernel.

In one or more embodiments, the first activation precision is less than the second activation precision. In one or more embodiments, the first weight precision is greater than the second weight precision. In one or more embodiments, the first activation precision is greater than the second weight precision.

In one or more embodiments, the transition is determined by a performance estimator. For example, the performance estimator iteratively varies a description of the convolutional neural network to approach an optimal value of a selected hardware system metric. As another example, the performance estimator sweeps over a plurality of possible precision configurations, and for each precision configuration, the performance estimator checks data reuse and memory occupancy to estimate latency for given system constraints. In one or more embodiments, each precision configuration defines an assignment of activation precisions and weight precisions to each of the layers of the convolutional neural network.

In another aspect, an exemplary method 600 includes at 602 establishing a convolutional neural network 100. The convolutional neural network includes a front layer 106 that has a first number of neurons and a first convolutional kernel; a back layer 110 that has a second number of neurons and a second convolutional kernel, wherein the second number of neurons is less than the first number of neurons; and a plurality of other layers that are connected between the front layer and the back layer. The method includes at 604 selecting from among the plurality of other layers a transition layer 112 that has a third number of neurons and a third convolutional kernel; at 606 assigning the first convolutional kernel to neurons from the front layer back to the transition layer; and at 608 assigning the second convolutional kernel to neurons from the transition layer back to the back layer. The first convolutional kernel has a first compression by reducing to zero values that are less than a first fixed fraction of the maximum value in the kernel window. The second convolutional kernel has a second compression by reducing to zero values that are less than a second fixed fraction of the maximum value in the kernel window. The second fixed fraction is smaller than the first fixed fraction. The transition layer is selected to correspond to a transition from activation-heavy layers to weight-heavy layers.

In one or more embodiments, the third convolutional kernel may be the same as the first convolutional kernel or may be the same as the second convolutional kernel.

In yet another aspect, an exemplary method 500 includes at 502 establishing a convolutional neural network 100. The convolutional neural network includes a front layer 106 that has a first number of neurons and a first convolutional kernel; a back layer 110 that has a second number of neurons and a second convolutional kernel, wherein the second number of neurons is less than the first number of neurons; and a plurality of other layers that are connected between the front layer and the back layer. The method includes at 504 selecting from among the plurality of other layers a transition layer 112 that has a third number of neurons and a third convolutional kernel; at 506 assigning a first activation precision to activations of neurons from the front layer back to the transition layer and assigning a first weight precision to weights of inputs to the neurons from the front layer back to the transition layer; and at 508 assigning a second activation precision to activations of neurons from the transition layer back to the back layer and assigning a second weight precision to weights of inputs to the neurons from the transition layer back to the back layer. The first activation precision is less than the first weight precision. The second activation precision is greater than the second weight precision. The transition layer is selected to correspond to a transition from activation-heavy layers to weight-heavy layers.

Figure 7:
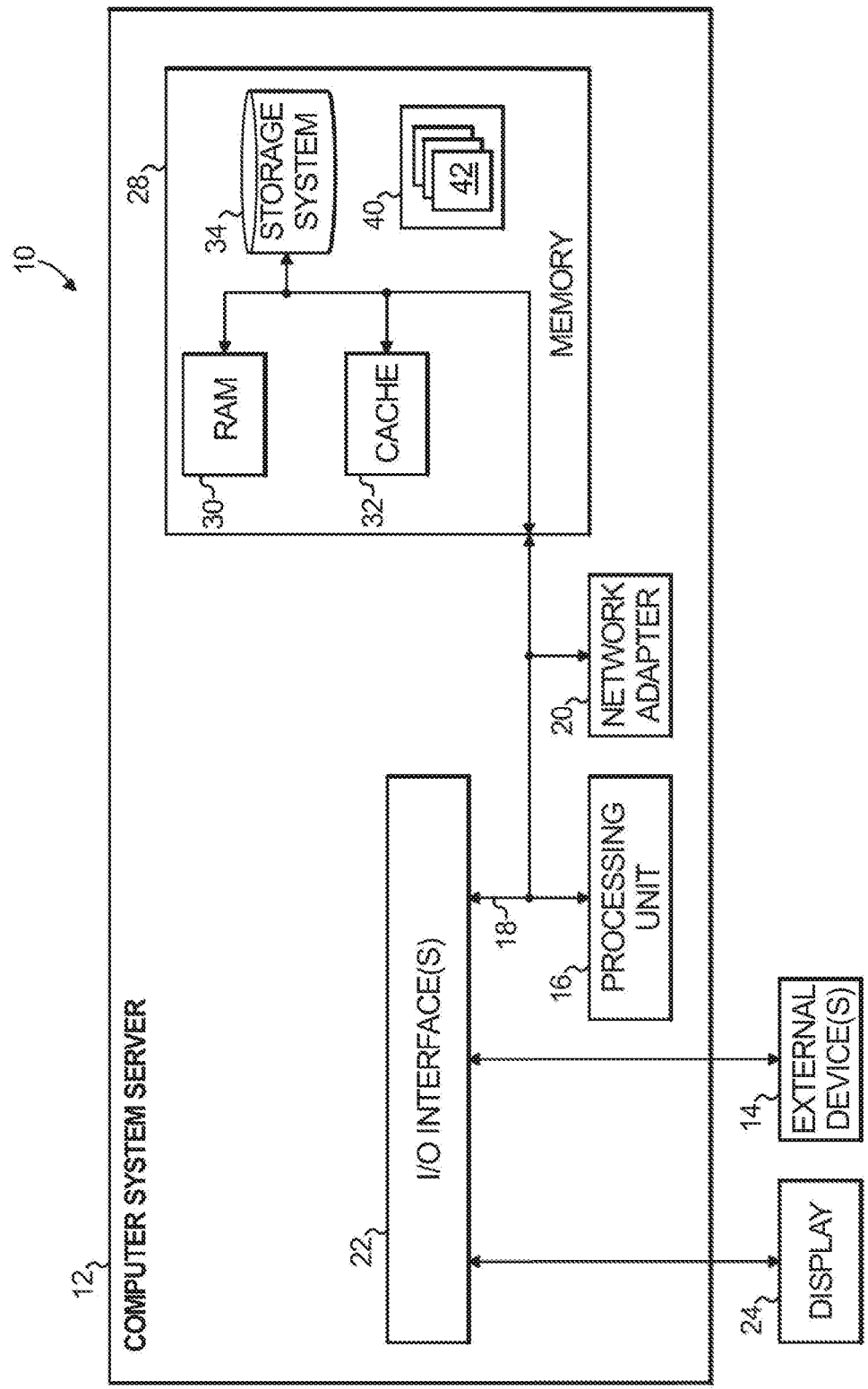
FIG. 7 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 7 depicts a computer system that may be useful in implementing one or more aspects and/or elements of the invention In computer system 10 there is a computer server 12, which is operational with numerous other general purpose or special purpose computing system environments or configurations. Examples of well-known computing systems, environments, and/or configurations that may be suitable for use with computer server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer server 12 may be described in the general context of computer system executable instructions, such as program modules, being executed by a computer system. Generally, program modules may include routines, programs, objects, components, logic, data structures, and so on that perform particular tasks or implement particular abstract data types. Computer server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer server 12 in computer system 10 is shown in the form of a general-purpose computing device. The components of computer server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer server 12 typically includes a variety of computer system readable media. Such media may be any available media that is accessible by computer server 12, and it includes both volatile and non-volatile media, removable and non-removable media.

System memory 28 can include computer system readable media in the form of volatile memory, such as random access memory (RAM) 30 and/or cache memory 32. Computer server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer server 12 may also communicate with one or more external devices 14 such as a keyboard, a pointing device, a display 24, etc.; one or more devices that enable a user to interact with computer server 12; and/or any devices (e.g., network card, modem, etc.) that enable computer server 12 to communicate with one or more other computing devices. Such communication can occur via Input/Output (I/O) interfaces 22. Still yet, computer server 12 can communicate with one or more networks such as a local area network (LAN), a general wide area network (WAN), and/or a public network (e.g., the Internet) via network adapter 20. As depicted, network adapter 20 communicates with the other components of computer server 12 via bus 18. It should be understood that although not shown, other hardware and/or software components could be used in conjunction with computer server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    establishing a convolutional neural network that includes:
        a front layer that has a first number of neurons and a first convolutional kernel;
        a back layer that has a second number of neurons and a second convolutional kernel, wherein the second number of neurons is less than the first number of neurons; and
        a plurality of other layers that are connected between the front layer and the back layer;
    selecting from among the plurality of other layers a transition layer that has a third number of neurons and a third convolutional kernel;
    assigning a first activation precision to activations of neurons from the front layer back to the transition layer and assigning a second activation precision to activations of the neurons from the transition layer back to the back layer, wherein the first activation precision is different from the second activation precision; and
    assigning a first weight precision to weights of inputs from neurons from the front layer back to the transition layer and assigning a second weight precision to weights of inputs to the neurons from the transition layer back to the back layer, wherein the first weight precision is different than the second weight precision,
    wherein the transition layer is selected to correspond to a transition from activation-heavy layers to weight-heavy layers.

2. The method of claim 1 wherein at least one of the second convolutional kernel and the third convolutional kernel is different from the first convolutional kernel.

3. The method of claim 1 wherein the first activation precision is less than the second activation precision.

4. The method of claim 1 wherein the first weight precision is greater than the second weight precision.

5. The method of claim 1 wherein the first activation precision is greater than the second weight precision.

6. The method of claim 1 wherein the transition is determined by a performance estimator that estimates a performance metric as a function of potential different transition layers.

7. The method of claim 6 wherein the performance estimator iteratively varies a description of the convolutional neural network to approach an optimal value of a selected hardware system metric.

8. The method of claim 6 wherein the performance estimator sweeps over a plurality of possible precision configurations, and for each precision configuration, the performance estimator checks data reuse and memory occupancy to estimate latency for given system constraints.

9. The method of claim 8 wherein each precision configuration defines an assignment of activation precisions and weight precisions to each of the layers of the convolutional neural network.

10. A method comprising:
    establishing a convolutional neural network that includes:
        a front layer that has a first number of neurons and a first convolutional kernel;
        a back layer that has a second number of neurons and a second convolutional kernel, wherein the second number of neurons is less than the first number of neurons; and
        a plurality of other layers that are connected between the front layer and the back layer;
    selecting from among the plurality of other layers a transition layer that has a third number of neurons and a third convolutional kernel;
    assigning the first convolutional kernel to neurons from the front layer back to the transition layer, wherein the first convolutional kernel has a first compression by reducing to zero values that are less than a first fixed fraction of the maximum value in the kernel window; and
    assigning the second convolutional kernel to neurons from the transition layer back to the back layer, wherein the second convolutional kernel has a second compression by reducing to zero values that are less than a second fixed fraction of the maximum value in the kernel window, wherein the second fixed fraction is smaller than the first fixed fraction,
    wherein the transition layer is selected to correspond to a transition from activation-heavy layers to weight-heavy layers.

11. The method of claim 10 wherein the transition is determined by a performance estimator.

12. The method of claim 11 wherein the performance estimator iteratively varies a description of the convolutional neural network to approach an optimal value of a selected hardware system metric.

13. The method of claim 11 wherein the performance estimator sweeps over a plurality of possible precision configurations, and for each precision configuration, the performance estimator checks data reuse and memory occupancy to estimate latency for given system constraints.

14. The method of claim 13 wherein the possible precision configurations define assignments of the first convolutional kernel and the second convolutional kernel to different layers of the convolutional neural network.

15. A method comprising:
 establishing a convolutional neural network that includes:
  a front layer that has a first number of neurons and a first convolutional kernel;
  a back layer that has a second number of neurons and a second convolutional kernel, wherein the second number of neurons is less than the first number of neurons; and
  a plurality of other layers that are connected between the front layer and the back layer;
 selecting from among the plurality of other layers a transition layer that has a third number of neurons and a third convolutional kernel;
 assigning a first activation precision to activations of neurons from the front layer back to the transition layer and assigning a first weight precision to weights of inputs to the neurons from the front layer back to the transition layer, wherein the first activation precision is less than the first weight precision; and
 assigning a second activation precision to activations of neurons from the transition layer back to the back layer and assigning a second weight precision to weights of inputs to the neurons from the transition layer back to the back layer, wherein the second activation precision is greater than the second weight precision;
 wherein the transition layer is selected to correspond to a transition from activation-heavy layers to weight-heavy layers.

16. The method of claim 15 wherein at least one of the second convolutional kernel and the third convolutional kernel is different from the first convolutional kernel.

17. The method of claim 15 wherein the first activation precision is less than the second activation precision.

18. The method of claim 15 wherein the transition is determined by a performance estimator.

19. The method of claim 18 wherein the performance estimator iteratively varies a description of the convolutional neural network to approach an optimal value of a selected hardware system metric.

20. The method of claim 18 wherein the performance estimator sweeps over a plurality of possible precision configurations, and for each precision configuration, the performance estimator checks data reuse and memory occupancy to estimate latency for given system constraints.

\* \* \* \* \*